United States Patent [19]

Swain

[11] Patent Number: 4,813,845
[45] Date of Patent: Mar. 21, 1989

[54] OBJECT TRANSPORT APPARATUS

[75] Inventor: Danny C. Swain, San Jose, Calif.

[73] Assignee: Advanced Control Engineering, Inc., Santa Clara, Calif.

[21] Appl. No.: 26,183

[22] Filed: Mar. 16, 1987

[51] Int. Cl.$^4$ .............................................. B28J 9/06
[52] U.S. Cl. .................................. 414/744.5; 901/19; 74/570
[58] Field of Search ................. 414/744, 917; 901/15, 901/19, 25, 40; 269/58, 71; 74/665 B, 86, 519, 570

[56] References Cited

U.S. PATENT DOCUMENTS

| | | | |
|---|---|---|---|
| 3,137,394 | 6/1964 | Trudeau | 214/1 |
| 3,170,333 | 2/1965 | Umbricht | 74/84 |
| 3,199,443 | 8/1965 | Danly | 100/207 |
| 3,215,284 | 11/1965 | Poyet et al. | 214/1 |
| 3,272,347 | 9/1966 | Lemelson | 414/735 X |
| 3,403,575 | 3/1966 | Miller | 74/471 |
| 4,364,707 | 12/1982 | Ott | 414/744 |
| 4,368,018 | 1/1983 | Rees et al. | 425/138 |
| 4,403,907 | 9/1983 | Koller et al. | 414/744 |
| 4,447,097 | 5/1984 | Lafevers et al. | 312/215 |
| 4,483,654 | 11/1984 | Koch et al. | 414/744 R |
| 4,537,071 | 8/1985 | Waterman | 73/432 |
| 4,568,070 | 2/1986 | Severt | 269/71 X |
| 4,580,942 | 4/1986 | Miksch et al. | 414/749 |
| 4,636,138 | 1/1987 | Gorman | 901/15 X |
| 4,674,947 | 6/1987 | Hamada et al. | 414/744 R X |

FOREIGN PATENT DOCUMENTS 0113635 9/1981 Japan ..................................... 271/97

OTHER PUBLICATIONS

A G Associates advertisement for "HEATPULSE 2101".
SCSS Instruments advertisement for "Class 1" Wafer Transfer Arm.

Primary Examiner—Robert J. Spar
Assistant Examiner—Donald W. Underwood
Attorney, Agent, or Firm—Michael J. Hughes

[57] ABSTRACT

An object transport apparatus (10) is provided for the purpose of transporting an object (19), usually a semiconductor wafer, to various points within a planar circular zone (Z). The transport apparatus (10) includes a motive power subassembly (12) for generating rotational motion and delivering it to an arm subassembly (14) rotating about an elbow axis (20) and, through an eccentric drive subassembly (110) to a hand subassembly (16) adapted to support to wafer (19). The hand subassembly (16) rotates about a wrist axis (21) which is parallel to but displaced from the elbow axis (20) in an independent fashion from the rotation of the arm subassembly (14). The eccentric drive subassembly (110) incorporates complimentary pairs of cam drivers (111, 112) connected by cam linkages (120, 122) to deliver rotational motion from the elbow axis (20) to the wrist axis (21). The apparatus (10) is particularly useful in the semiconductor manufacturing field where it may be used for a variety of tasks, primarily in delivering wafers (19) from one workstation position to another in a precisely controllable manner.

12 Claims, 4 Drawing Sheets

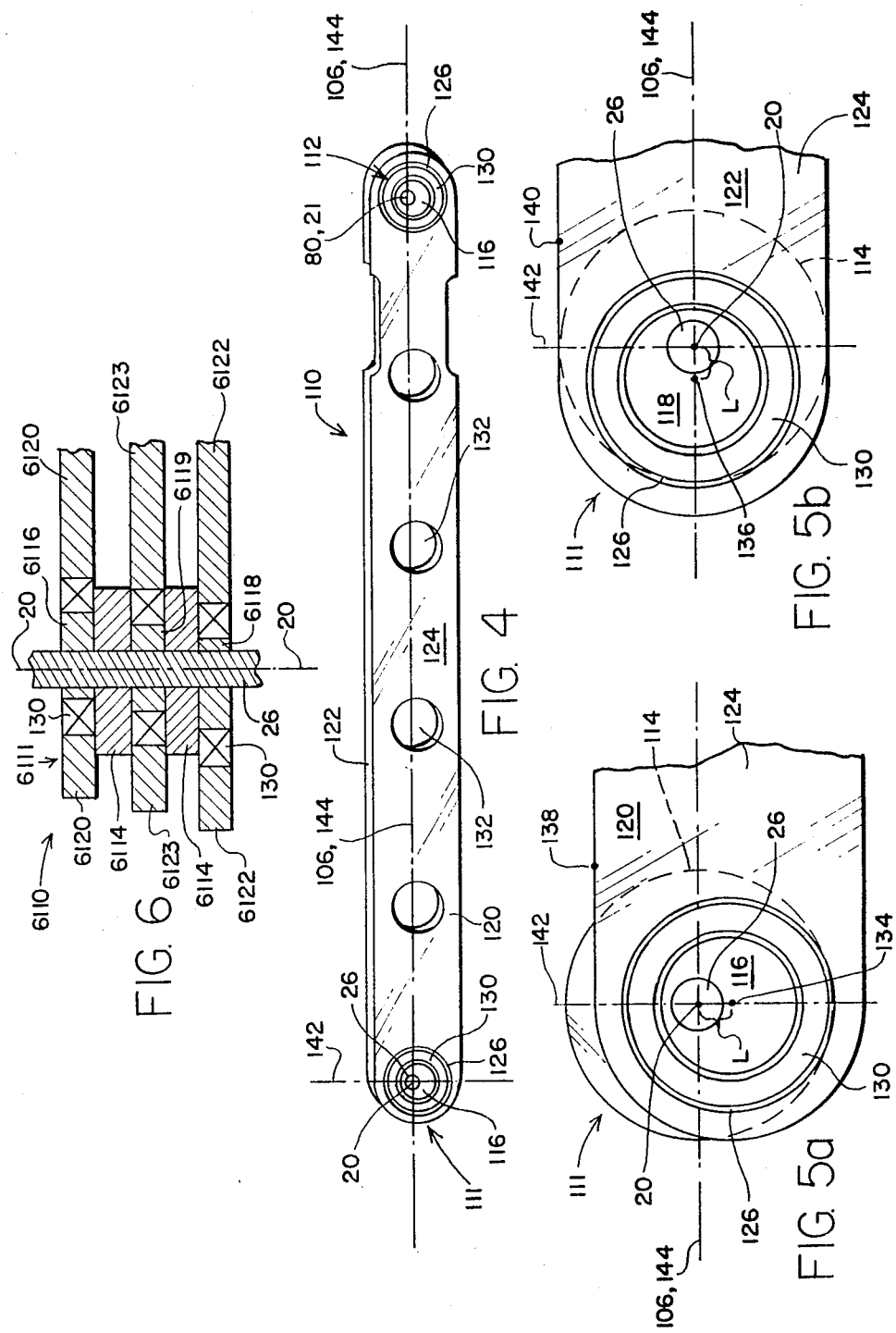

OBJECT TRANSPORT APPARATUS

TECHNICAL FIELD

The present invention relates generally to the field of robotic object transportation, and more specifically to devices that transfer objects between two or more fixed locations.

BACKGROUND ART

In manufacturing processes there is often a requirement that the workpiece be moved from station to station for successive operations. If the manufacturer wants his process to be automated, he must have some mechanical device to accomplish the transfer. Since manufacturing efficiency demands automation, there are myriad inventions in the prior art tailored to this purpose.

Many of the devices in the prior art are tailored specifically to a given manufacturing process. The "Transporter for Injection-Molded Parts or Inserts Therefor" of Herbert Rees and Klaus B. Fritzsche, U.S. Pat. No. 4,368,018, issued Jan. 11, 1983, is one example. Another is the "Method and Apparatus for Removing and Transferring Finished Glass Articles" of Urban P. Trudeau, U.S. Pat. No. 3,137,394, issued June 16, 1964. Somewhat more general methods of transfer are disclosed in other inventions, as in the "Workpiece Distributors" of Poyet, et al., U.S. Pat. No. 3,215,284, issued Nov. 2, 1965, which discloses a device for distributing workpieces in machining processes. A similar device is the "Automatic Transfer Mechanism for Press Line" of James C. Danly, U.S. Pat. No. 3,199,443, issued Aug. 10, 1965.

The preceding devices all envision usage in a "heavy" industrial setting. As such, design considerations such as contaminant production, high precision of motion reproducibility, and space constraints are not of utmost importance. Therefore, in the "heavy" industrial setting, the large, gear-driven devices are quite satisfactory.

One of the major applications for a transfer device, particularly in the Silicon Valley, is in the semiconductor industry. Given the special environment of semiconductor processing, it is clear that special equipment is required. One prior art device directed to this area is the "Micromanipulator" of Charles Fredrick Miller, U.S. Pat. No. 3,403,575, issued Oct. 1, 1968. Another is the "Object Transport Apparatus" of James D. Ott, U.S. Pat. No. 4,364,707, issued Dec. 21, 1982.

These latter devices reflect the needs of the semiconductor fabrication process. The heavy, contaminant producing oil lubricated gear drives are gone. The Ott device discloses a method of transfer that utilizes an electric stepping motor. Motion is imparted to the workpiece through a belt and pulley combination. The Miller device, although manually powered, reflects the preference for the belt and pulley arrangement in the clean room environment.

Belts and pulleys require no lubrication and are preferable for clean room use in all but the newest plants in that they generate relatively little particulate contamination. The inherent problem is that the belts must stretch and wear, so that the devices' motion reproducibility eventually must be impaired. The same is true even if a gear and sprocket combination is used.

Applicant also notes that various commercially available machines utilize transfer devices whose mechanisms are known to applicant. Among these are the "Wafer Transfer Arm" of SCSS instruments, the "Heatpulse 2101" of A. G. Associates, and the "Microwision 360" of Optical Specialties, Inc. These devices are commonly advertised in the semiconductor trade journals.

A need existed for a transfer device that had a very high degree of motion reproducibility, while still allowing for smooth travel of the parts. Further a need existed for a device that could accomplish the above while taking up very little space and being compatible with a clean room environment.

DISCLOSURE OF INVENTION

Accordingly, it is an object of the present invention to provide a precisely controllable object transport apparatus capable of delivering an object to any desired point within a predetermined radius.

It is another object of the present invention to provide a device which is readily digitable controllable both as to position and speed of relocation.

It is a further object of the present invention to provide an object transport apparatus which includes a vacuum attachment force for securing the objects being transported.

It is yet another object of the present invention to provide an object transport apparatus which may be utilized in a clean room environment with no parts which may generate particulate contamination.

Briefly, a preferred embodiment of the present invention is an object transport device adapted to transport a specified element, usually a semiconductor wafer, to any point in a plane within a specified radius of a origin point. An alternate embodiment of the device utilizes elevator techniques to increase the accessibility to a cylinder rather than merely a circular area. The preferred embodiment is adapted to be utilized with vacuum generation equipment in order to supply a vacuum pick-up mechanism to retain the object on the transport device.

The preferred device includes three primary subassemblies. These subassemblies are a motive drive subassembly, an arm subassembly and a hand subassembly. The motive drive subassembly includes motors for providing rotational motion to the hand and arm subassemblies and pneumatic connections providing vacuum to the arm and hand portions. A pair of coaxial shafts connect the motive power subassembly to the arm subassembly, with the axis of the shafts being perpendicular to and intersecting the origin of the positioning circle for the apparatus. The arm subassembly is adapted to rotate in conjunction with one of the shafts and to deliver the rotational motion of the other shaft to an extended point on the arm, known as the wrist, where it is then delivered to the hand subassembly about a further shaft providing a remote axis of rotation. The hand subassembly rotates about the wrist axis and includes an object grasping means, preferably a vacuum pick, and object support structure for carrying the preferred object within the desired area. The apparatus includes no gears, belts or drive chains but has its motion entirely defined by rotational shafts and a cam driver subassembly enclosed within the arm subassembly.

An advantage of the present invention is that the motive power subassembly may be situated outside of a clean area while the arm and hand subassemblies are situated within the clean area, thus minimizing the possibility of contamination.

Another advantage to the present invention is that particulate contamination generating elements such as gears, belts and drive chains are eliminated so that the possibility of particulate contamination caused by the motive apparatus is effectively eliminated.

A further advantage of the present invention is that motive rotational power is delivered to the secondary rotational axis of the arm in a constant torque manner.

Yet another advantage of the present invention is that vacuum may be delivered to the the hand subassembly without the utilization of tubes or other elements which could interfere with the free rotational motion of the apparatus.

A still further advantage of the present invention is that the dual cam linkage mechanism within the arm subassembly provides for constant speed, constant torque translation of rotational motion such that no "dead" spots exist in the rotational motion of the hand assembly.

Still another advantage is that the object may be transported to any position within the circular zone, including the origin point, thus eliminating the necessity of navigating around forbidden positions.

Yet another advantage is that the apparatus operates essentially free of backlash, while maintaining constant 1:1 indexing.

These and other objects and advantages of the present invention will become clear to those skilled in the art in view of the description of the presently known mode of carrying out the invention and the industrial applicability of the preferred embodiment as described herein and as illustrated in the several figures of the drawing.

BRIEF DESCRIPTION OF THE DRAWING

FIG. 4 is a top view of the eccentric drive subassembly;

FIG. 5a is a top view of the eccentric drive subassembly in the vicinity of one of the cam drivers;

FIG. 5b is a bottom view of the same vicinity as FIG. 5a, taken simultaneously therewith; and FIG. 6 is a vertical cross-sectional view of an alternate eccentric drive subassembly.

BEST MODE OF CARRYING OUT THE INVENTION

The present invention is an object transport apparatus adapted for transporting a desired object from point to point anywhere in a circular zone. The circular zone is defined as including any point in a selected plane within a given radius of a center point. The preferred embodiment of the object transport apparatus is a wafer handling device which is particularly adapted for transporting a silcon wafer from point to point during semiconductor manufacturing procedures.

It is helpful to think of the device as analogons to a human forearm and hand structure, with both the elbow and wrist being seen as perfect joints with 360° freedom of rotational movement.

Figure 1:
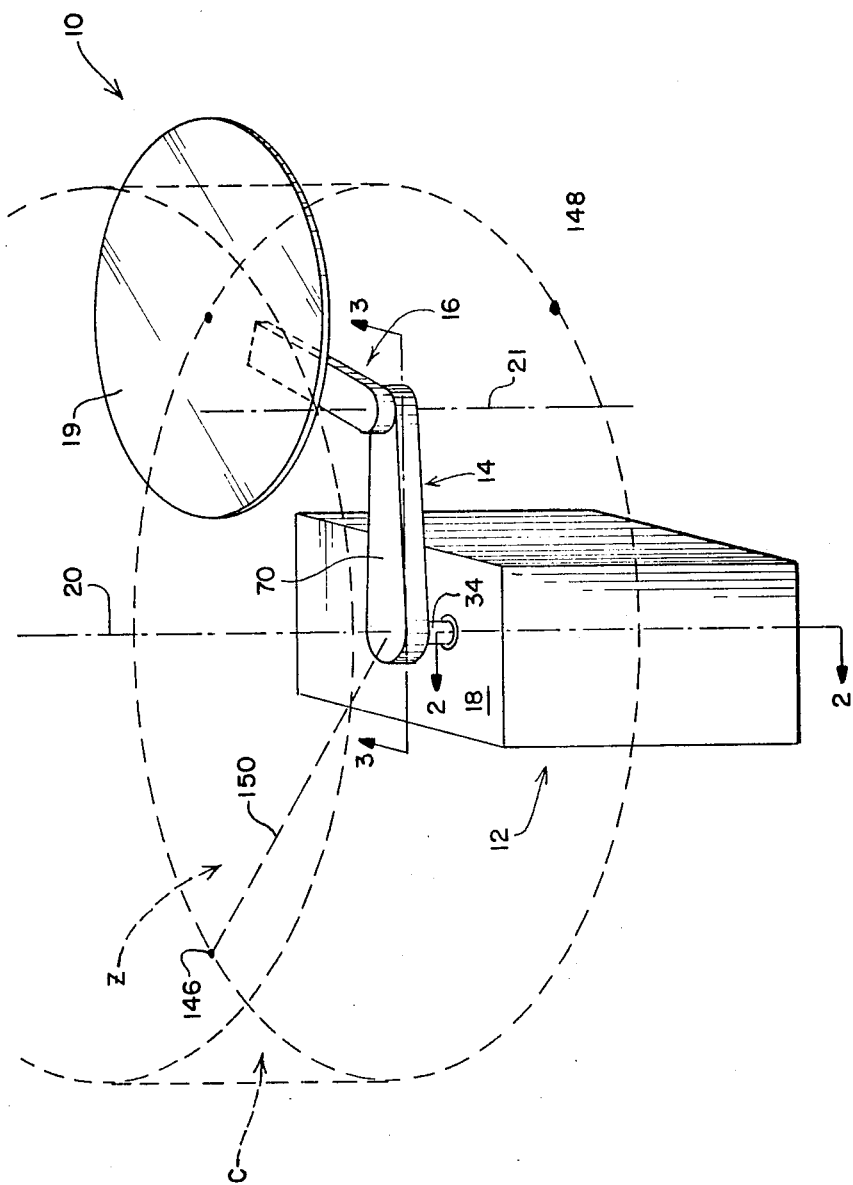
FIG. 1 is a perspective view of a preferred embodiment of an object transport apparatus according to the present invention.

Referring now to FIG. 1, the object transport apparatus of the preferred embodiment of the present invention is shown in a perspective view and is referred to by the general reference 10. As can be seen in this illustration, the object transport apparatus 10 is divided into three positional subassemblies. These subassemblies include a motive power subassembly 12 which provides the rotational motion and control, an arm intermediate subassembly 14 and a hand subassembly 16. The subassemblies are supported by a support structure 18 which includes elements to effectively isolate the motive power subassembly 12 from the arm subassembly 14 and hand subassembly 16. Typically the support structure 18 includes a clean area bulkhead. The hand subassembly 16 is the structure which actually handles a desired object 19, in the case a silcon wafer. The object 19 must be environmentally isolated during handling to prevent contamination. The support structure 18 shown in FIG. 1 accomplishes this purpose by including a dividing floor intermediate the motive power subassembly 12 and the arm subassembly 14 such that the arm subassembly 14, the hand subassembly 16, and the object 19 may be isolated in a clean area or contaminant free environment while the motive power subassembly 12 is situated outside such environment.

The freedom of movement of the object 19 is restricted to a circular zone Z as shown by the dotted line in FIG. 1. The circular zone Z has its origin at the intersection of the plane of rotation and a first axis 20, hereinafter referred to as the elbow axis 20. The hand subassembly 16 rotates about a second axis 21, hereinafter referred to as the wrist axis 21, which is situated at the opposite end of the arm subassembly 14 from the elbow axis 20. In the preferred embodiment the distance between the center of the object 19 and the wrist axis 21 is equivalent to the distance between the wrist axis 21 and the elbow axis 20 and the radius of the zone Z is equal to twice this distance. In this manner, since the arm subassembly 14 rotates freely about the elbow axis 20 and the hand subassembly 16 rotates freely about the wrist axis 21, the center point of the object 19 may be placed at any position within the zone Z by independently rotating the arm and hand subassemblies about their respective axis. The addition of an elevator mechanism would expand zone Z into a cylinder.

Figure 2:
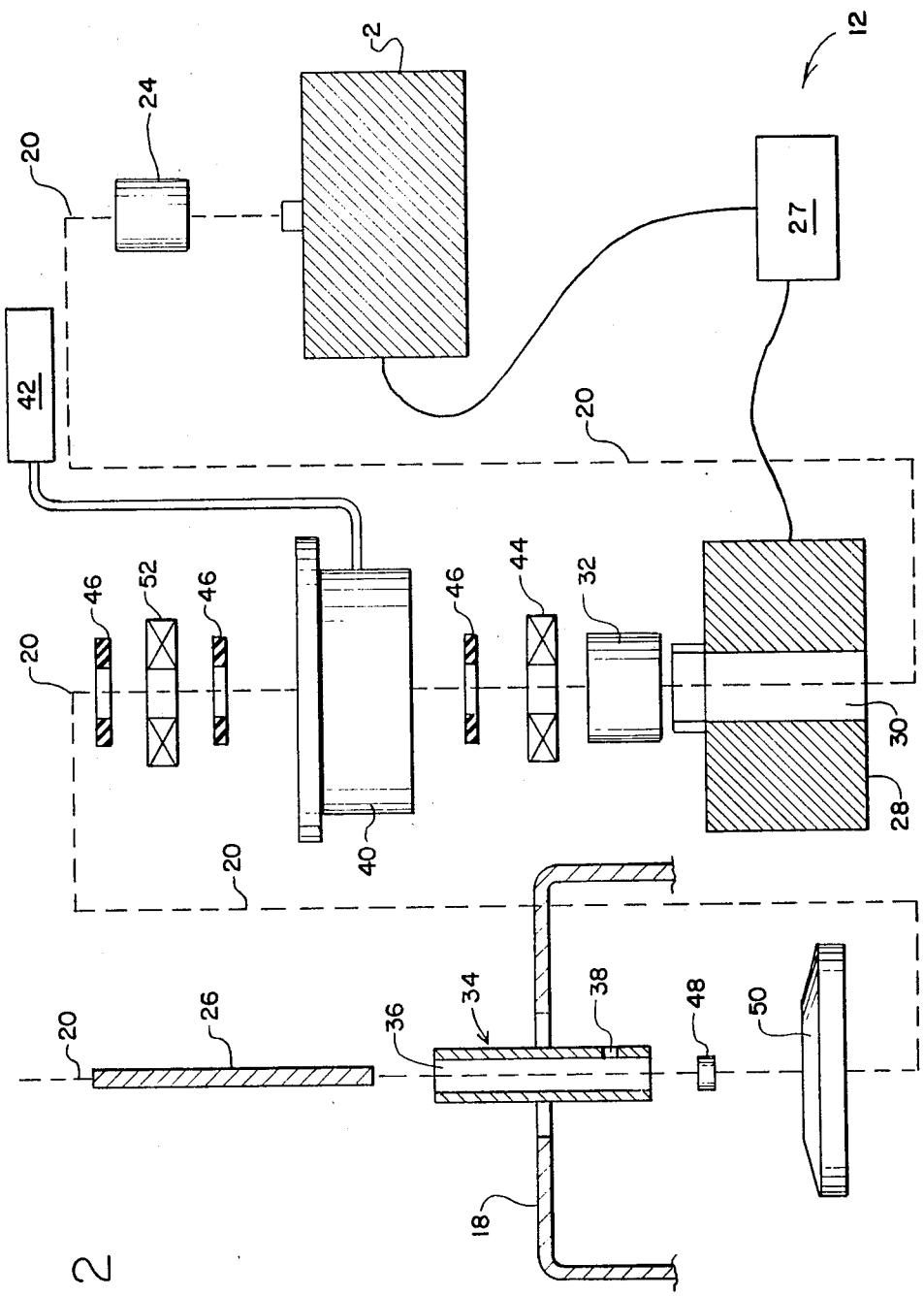
FIG. 2 is an exploded side elevational cross-section of the motive power subassembly.

Referring now to FIG. 2, the motive power subassembly 12 is illustrated in an exploded cross-sectional view with a cross-section being taken along line 2—2 of FIG. 1. The motive power subassembly 12 is illustrated as a cross-section and it may be seen that every element in the motive power subassembly 12 is effectively symmetrical about the elbow axis 21, illustrated by the dotted line of FIG. 2. The elbow axis 21 provides the axis about which the arm subassembly 14 rotates.

Beginning from the bottom of the motive power subassembly 12, assuming that the elbow axis 21 is vertical and the object is to be carried from underneath, a first element in the subassembly 12 is a first motor 22 also known as the hand motor. The hand motor 22 is a precisely controllable rotational positioning motor which is utilized to provide the rotational motion which is translated by elements within the arm subassembly to the wrist axis where the rotational force is used to control the positioning of the hand subassembly 16. The hand motor 22 is preferably either a very high precision step motor or a similar mechanical analog thereof.

The hand motor 22 is connected by means of a hand coupler 24 to a hand drive shaft 26, also known as the interior drive shaft 26. The hand coupler 24 is used to permit size differences between the motor 22 and the shaft 26 and also to provide universal joint capability, such that precise alignment is not required. The degree of rotation of the hand drive shaft 26 is controlled by rotation of the first motor 22. Generalized control circuitry 27 of any of several well-known types is utilized to deliver signals to the various elements within the motive power subassembly 12 to control the specific rotation of the motor elements.

Situated directly above and concentric with the first motor 22 is a second motor 28, also known as the arm motor 28. The arm motor 28 controls the degree of rotation of the arm subassembly 14 about the elbow axis 20. The arm motor 28 includes a longitudinal central aperture 30 which permits the hand drive shaft 26 to pass through the center thereof without interference. The arm motor 28 attaches by means of a arm coupler 32, similar to coupler 24, to an arm drive shaft 34, which is in the form of a hollow shaft including an axial channel 36 for receiving the hand drive shaft 26. The arm drive shaft 34 is also sometimes referred to as the hollow shaft or the exterior shaft 34, as opposed to the interior shaft 26.

One of the features of the preferred embodiment of the object transport apparatus 10 is that it is adapted to utilize disparate pressure conditions as a bonding technique in the hand subassembly 16. For this purpose, it is desirable to include elements which permit the object transport apparatus 10 to deliver pneumatic signals, in the form of either vacuum or positive pressure, to the hand apparatus through the remaining elements of the object transport apparatus 10. A portion of the pneumatic delivery elements are included in the motive power subassembly 12. Initially, the arm drive shaft 34 is provided with a pneumatic aperture 38 which is radially situated along the arm drive shaft 34 at a point such that it will fall within a pneumatic spindle 40 situated just above the second motor 28. The pneumatic spindle 40 is a stationary element having a interior cavity which receives positive and negative pneumatic pressure from external pneumatic control elements 42. The positive and negative pneumatic pressure generated within the pneumatic spindle 40 is then translated through the pneumatic aperture 38 to the interior of the axial channel 36 within the arm drive shaft 34, and thereby to the arm subassembly 14. Pneumatic isolation of the interior of the pneumatic spindle 40 is maintained at the bottom of the pneumatic spindle 40 by a first arm drive shaft bearing 44 with an associated vacuum seal 46 to provide an airtight seal about the arm drive shaft 34 and a smaller hand shaft vacuum seal 48 to prevent leakage about the hand drive shaft 26. The handdrive pneumatic seal 48 is actually situated within the axial channel 36 at a location below the pneumatic aperture 38.

At the upper end of the pneumatic spindle 40 is provided a spindle cover 50 which mates with the pneumatic spindle 40 to form an enclosed volume. A second arm shaft bearing 52 is provided within the cover 50 to support the arm drive shaft 34. The pneumatic isolation of the interior of the pneumatic spindle 40 is secured at the spindle cover 50 by an additional pair of identical exterior shaft vacuum seals 46 which surround the second arm shaft bearing 52. Two additional seals are required in order to isolate the bearing 52 from vacuum, since vacuum may be detrimental to bearing performance and durability.

These elements permit the introduction of positive and negative pneumatic pressure into the interior of the axial channel 36 of the arm drive shaft 34. In this manner pneumatic pressure may be delivered to the arm subassembly 14 and the hand subassembly 16 illustrated in FIG. 3.

Figure 3:
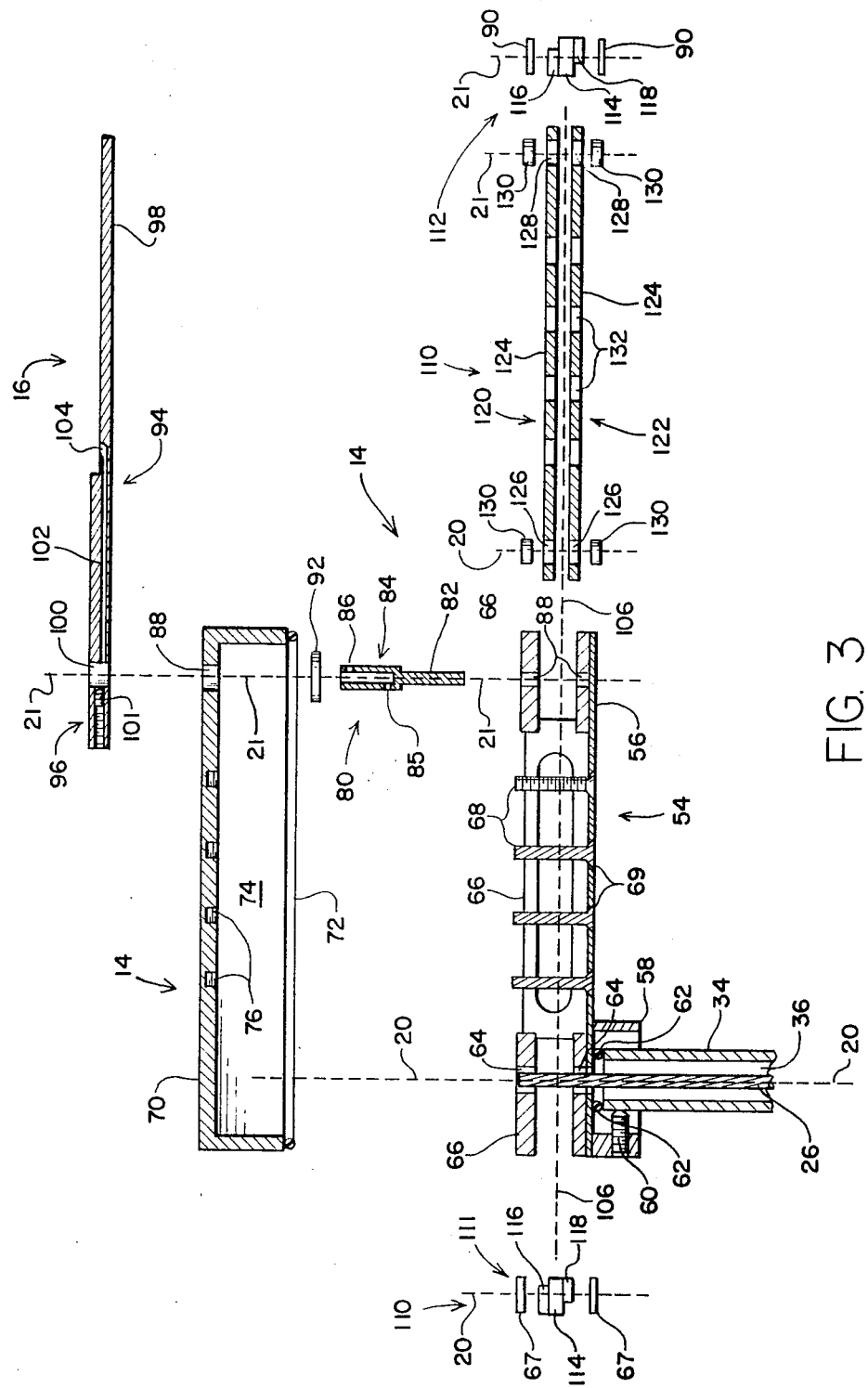
FIG. 3 is an exploded side elevational cross-section of the arm subassembly and the hand subassembly.

Referring now to FIG. 3, the arm subassembly 14 and the hand subassembly 16 are shown in an exploded vertical cross-sectional view. The direction of explosion is vertical with respect to all elements and horizontal with respect to certain of the elements of the arm subassembly 14. As in FIGS. 1 and 2, the reference for positioning of the elements is provided by the elbow axis 20 and the wrist axis 21. The axes 20 and 21 are shown as dotted lines and are labeled wherever they appear to aid the observer in understanding the exploded illustration.

The arm subassembly 14 includes an arm frame member 54 which includes a base plate 56 to which is bonded an arm shaft receiver element 58. The arm shaft receiver is adapted to receive and secure the arm drive shaft 34. A set screw 60 holds the arm drive shaft 34 firmly within the arm shaft receiver 58 and provides that the arm subassembly 14 directly rotates with the rotation of the arm drive shaft 34. A arm shaft vacuum seal 62 is provided within the arm shaft receiver 58 to prevent a loss of pneumatic pressure between the top end of the arm drive shaft 34 and the base plate 56.

A hand shaft channel 64 is provided both through the base plate 56 and through an interior frame member 66 which is mounted on the base plate 56 to permit free rotational passage of the hand drive shaft 26. The interior frame member, along with the base plate 56, and the arm shaft receiver 58 are integrally formed to constitute the arm frame member 54. A pair of vacuum permeable hand shaft bearings 67 are placed within the hand shaft channel 64 within the interior frame 66 to maintain alignment. The hand shaft aperture 64 is of greater diameter than the hand drive shaft 26 (approximately the same diameter as the axial channel 36) in order to permit free pneumatic passage between the interior of the arm subassembly 14 and the axial channel 36 of the arm drive shaft 34. This permits the pneumatic condition of the interior of the arm subassembly 14 to be controlled by the external pneumatic control elements 42 illustrated in FIG. 1.

The base plate 56 is further provided with a series of threaded support post screws 68 which pass through a series of screw insertion apertures 69 in the base plate 56. The support posts 68 provide the support and attachment positions for an arm cover 70 which, with the base plate 56 and a vacuum sealable gasket 72, typically in the form of an O-ring, forms the interior volume 74 of the arm subassembly 14 in such a manner that it is pneumatically isolated (airtight). The support posts 68 are received in a corresponding series of threaded post detents 76 set in the upper interior surface of the arm covers 70. The support post screws 68 may be utilized to tighten down the arm cover 70 on the base plate 56 and secure the airtight interior volume 74. The hand drive shaft 26 truncates within the volume 74 so that it does not intersect the cover 70.

At the opposite end of the arm subassembly 14 from the hand drive shaft 26 is a wrist drive shaft 80. The wrist drive shaft 80 is concentric with the wrist axis 21 and provides the means by which the hand subassembly 16 is rotated and supported. The wrist drive shaft 80 includes a lower solid portion 82 and a upper hollow portion 84. The hollow portion 84 includes a lower pneumatic aperture 85 which is open to the interior volume 74 in order that the interior of the hollow portion 84 is subject to the pneumatic pressures and vacuums created in the interior volume 74 by the pneumatic elements 42. Near the top of the hollow portion 84, at a position above the cover 70 where the wrist 80 interfaces with the hand subassembly 16, is provided an upper pneumatic aperture 86.

The wrist drive shaft 80 rotates within a cylindrical wrist shaft channel 88 which is formed in the arm cover 70 and the interior frame 66. The bottom end of the wrist shaft 80 truncates within the interior frame 66 and does not intersect the base plate 56. A pair of vacuum permeable wrist shaft bearings 90 are placed about the wrist shaft 80 within the wrist shaft channel 88 in the interior frame 66 to maintain alignment. At the point where the wrist shaft 80 passes through the wrist shaft aperture 88 in the arm cover 70, a wrist drive vacuum seal 92 is provided to prevent pressure transfer about the wrist drive shaft 80.

The hand subassembly 16 includes a hand plate 94 which may be thought of as including a thicker palm portion 96 and a thinner finger portion 98. The finger portion 98 is also referred to as the pick portion. The palm portion 96 includes a wrist shaft receiving detent 100 which allows the wrist shaft 80 to be firmly attached to the hand plate 94, by a set screw 101 or similar securing method, in such a manner that the arm subassembly 16 will rotate directly with the wrist drive shaft 80. Beginning within the wrist shaft detent 100, and extending through the hand plate 94, is a pneumatic bore 102. The pneumatic bore 102 is situated such that it aligns with the pneumatic aperture B6 on the wrist drive shaft 80 and culminates within the pick portion 98 in a gripping trough 104. The gripping trough 104 is an elongated shallow trough which provides a zone over which the object 19 (see FIG. 1) may be vacuum secured to the pick portion 98. A reversal of pneumatic pressure from negative to positive will dislodge the object 19 from the pick portion 98.

A further important subassembly of the invention provides the method for transferring rotational motion from the hand drive shaft 26 to the wrist drive shaft 80. This subassembly is referred to as an eccentric drive subassembly 110 and is shown in FIG. 3 as being horizontally exploded from the remainder of the arm subassembly 14. The direction of explosion is along a horizontal axis 106 which bisects the interior 74 of the arm subassembly 14. The horizontal axis 106 is shown as a dotted line in FIG. 3.

The eccentric drive subassembly is best understood from the illustrations of FIGS. 3 4, 5a and 5b. The eccentric drive subassembly 110 is symmetrical both vertically about the horizontal plane containing the horizontal axis 106 but also about a vertical bisecting plane. Equivalent structures exist about both the elbow axis 20 and the wrist axis 21. For example, a first cam driver 111 is situated about the hand drive shaft 26 (and the elbow axis 20) while a similar second cam driver 112 is situated about the solid portion 82 of the wrist drive shaft 80 (and the wrist axis 21). Each of the cam drivers 111 and 112 includes a central cylinder 114, an upper eccentric cylinder 116, and a lower eccentric cylinder 118, each of which is securely bonded to the respective drive shaft such that they will rotate together. The cam driver assemblies 111 and 112 also may be considered to respectively include the hand drive shaft bearings 67 and wrist drive shaft bearings 90.

The rotational forces are delivered from the first cam driver 111, which is connected to the motive power subassembly 12, to the second cam driver 112 which drives the hand subassembly 16 via an upper cam linkage 120 and a lower cam linkage 122. The upper and lower cam linkages 120 and 122 are identical in construction. Each includes an elongated linkage plate 124 best seen in FIG. 4. The linkage plate 124 includes a first driver aperture 126 at the end corresponding to the elbow axis 20 and a second driver aperture 128 at the end corresponding to the wrist axis 21. The first driver aperture 126 and the second driver aperture 128 each are adapted to receive a linkage bearing 130 within the apertures. The linkage bearings 130 are adapted to fit over the respective upper eccentric cylinders 116 and lower eccentric cylinders 118 on the cam drivers 111 and 112. The linkage bearings 130 will slidably rotate about the respective eccentric cylinders 116 and 118 and convert the rotational motion of the cam drivers 111 and 112 into horizontal motion of the linkage plates 124. At the opposing end the translational motion of the linkage plate 124 is retranslated into rotational motion by the interaction between the linkage bearing 130 and the appropriate eccentric cylinder 116 or 118. The linkage plate 124 also includes support post apertures 132 which permit the cam linkages 120 and 122 to move without abutting against the support post screws 68.

The manner in which the rotational motions are translated is best understood from the illustrations of FIG. 4, 5a, and 5b. FIG. 4 is a top view of the eccentric drive subassembly 110 which illustrates the manner in which the lower cam linkage 122 and the upper cam linkage 12D are offset from each other during usage. FIGS. 5a and 5b are top and bottom views, respectively, of the eccentric drive subassembly 110 in the immediate vicinity of the first cam driver 111. FIGS. 5a and 5b are simultaneously existing and show the manner in which the lower eccentric cylinder 118 is rotational displaced from the upper eccentric cylinder 116. It is this displacement that causes the different positioning of the upper cam linkage 120 and the lower cam linkage 122, as seen in FIG. 4.

Referring now to FIG. 4, it may be seen that the upper cam linkage 120 is associated with the upper eccentric cylinder 116 on both the first cam driver 111 and the second cam driver 112 and that the upper eccentric cylinders on the two cam drives are aligned identically. The alignment of the upper eccentric cylinders 116 of the respective cam drivers in FIG. 4 is shown to correspond with that of FIG. 5a. It may be clearly seen in FIG. 5a that the upper eccentric cylinder 116 is eccentrically mounted upon the hand drive shaft 26. In FIG. 5b it may be seen that the lower eccentric cylinder 118 is also eccentrically mounted about the hand drive shaft 26 but that the direction of eccentricity is offset 90° from the direction of the eccentricity corresponding to the upper eccentric cylinder 116. Although FIGS. 5a and 5b illustrate only the first cam driver 111 it is understood that the second cam driver 112 is identically constructed.

When the hand drive shaft 26 rotates concentrically about the elbow axis 20, the rotational motion of the hand drive shaft 26 is translated into translational motion of the upper cam linkage 120 and the lower cam linkage 122. This occurs because the upper and lower eccentric cylinders 116 and 118 are securely bonded to the hand drive shaft 26 and rotate therewith. However, the linkage bearings 130 which are situated about the eccentric cylinders 116 and 118 and within the first driver apertures 126 are free to rotate about the eccentric cylinders 116 and 118. This rotation is necessary since it is desired to keep the motion of the linkage plates 124 within a relatively narrow channel. If the linkage plates 124 were directly coupled to the eccentric cylinders 116 and 118 they would describe circles in their motion with the circles having a radius equal to the length of the linkage plate 124. In reality, what is desired is a motion of any given point on the linkage plate 124 which describes a circle having the same radius as the degree of eccentricity of the eccentric cylinders 116 and 118.

As can be seen by FIG. 5a, the upper eccentric cylinder 116 has a first eccentric axis 134 which constitutes the origin for the eccentric cylinder 116, the associated linkage bearing 130 and the associated first driver aperture 126. The first eccentric axis 134 is offset from the elbow axis 120 by a distance L. This distance L defines the degree of eccentricity of the upper eccentric cylinder 116. Similarly, as shown in FIG. 5b, the lower eccentric cylinder 118 is radially symmetrical about a second eccentric axis 136, also separated by a distance L from the elbow axis 20. The first eccentric axis 134 and the second eccentric axis 136 are situated at the same radius from the arm axis 20 but are 90° offset in their direction of separation. This 90° offset is important in maintaining constant torque throughout the eccentric drive subassembly 110, regardless of the rotational position of the hand drive shaft 26.

Due to the eccentricity of the operation and the offset between the upper cam linkage 120 and the lower cam linkage 122, the upper cam linkage 120 and the lower cam linkage 122 will always be positionally offset from one another in such a manner that corresponding points on the two cam linkages will be separated by L multiplied by square root of 2. This may be seen by comparing the position of a first arbitrary point 138 on the upper cam driver 120 in FIG. 5a with a second arbitrary point 140 located in a corresponding position on the lower cam linkage 122 in FIG. 5b. A vertical plane 142 is defined as including the elbow axis 20 and being perpendicular to a vertical plane 144 which includes the horizontal axis 106. It may be seen that the second arbitrary point 140 of FIG. 5b is offset by a greater degree from the linkage axis plane 144 than is the first arbitrary point 138 of FIG. 5a but by a correspondingly lesser amount from the elbow axis plane 142. This may also be seen by comparing the relative positions of the upper cam linkage 120 and the lower cam linkage 122 to the central cylinder 114, which is completely concentric with the elbow axis 120.

An analysis of the torques generated in the rotation of the hand drive shaft 26 shows that the maximum torque upon the upper cam linkage 120 occurs in the position illustrated in FIG. 5a while the minimum effective torque upon the lower cam linkage 122 occurs in the position illustrated in FIG. 5b. Since the positions of FIG. 5a and FIG. 5b are simultaneous it may be seen that the net torque delivered to the wrist drive shaft 80 is balanced by the degree of offset created by the upper and lower eccentric cylinders 116 and 118. Similarly, the minimum torque on the upper cam linkage 120 will occur at the time when the maximum torque is being delivered to the lower cam linkage 122. At intermediate positions the same net torque will be delivered by a combination of the upper and lower cam linkages 122. In this manner a consistent torque is delivered to the wrist drive shaft 80, regardless of the rotational position of the hand drive shaft 26.

In a complete rotation of the hand drive shaft 26 the arbitrary points 138 and 140 will describe a circle of radius L. This motion will force a corresponding rotation of the wrist drive shaft 80 situated at the opposing end of the associated cam linkages 120 and 122. This correspondingly causes the entire hand subassembly 16 to rotate about the wrist axis 21 to any desired position. The geometric constance between the cam linkage 120, 122 and the cam drivers 111, 112 results in the system being subject to little or no backlash.

Since the hand and arm are independently driven by the hand motor 22 and the arm motor 28 the net result is that the object 19 may be positioned anywhere in a radius equal to the combined distance between the elbow axis 20 and the wrist axis 21 and the distance between the wrist axis 21 and the center of the object 19. The external control circuitry 27 is utilized to drive the hand motor 22 and the arm motor 28 to achieve any desired positioning within this circular zone Z.

A second preferred embodiment is identical to the first except that it adds an additional elevator element. This elevator element encompasses the entire apparatus 10 and causes it to move vertically with respect to the circular zone Z. In this embodiment the apparatus 10 is capable of delivering the center point of the object 19 to any point within a cylinder C, with the cylinder C being a vertical expansion of the circular zone Z. In this embodiment the support structure 18 will be eliminated or drastically altered to permit the vertical movement. To maintain environmental isolation the elevator mechanism may be shielded from the environment by a bellows cover centered about elbow axis 20.

In another contemplated embodiment 610, partially illustrated in FIG. 6, the alternate eccentric drive subassembly 6110 is altered from the preferred subassembly 110 to be a threelobe unit rather than the two-lobe unit of the preferred embodiment 10. In this alternate embodiment the cam drivers 6111 and 6112 (not shown) will include a central eccentric cylinder 6119 intermediate the upper eccentric cylinder 6116 and the lower eccentric cylinder 6118 and an associated central cam linkage 6123. The degree of offset of the eccentric cylinders 6116, 6118 and 6119 from each other is 120°. Thus the cylinders are equally spaced in a circular arc. The remaining components of the device are unchanged.

An advantage of the alternate embodiment 610 is that a pulling force will always be delivered by one of the cam linkages on the second cam driver 6112, regardless of the rotational position of the first cam driver 111. In the preferred embodiment 10 there exist positions where the only force is a push, rather than a pull. The pulling type of force is less susceptible to jamming and snagging. Thus the three-lobe embodiment 610, although bulkier and more difficult to manufacture and assemble, results in a greater force balance in operation than the preferred embodiment 10 while maintaining the equilibrium of torque.

The specific materials and dimensions utilized for the various elements are primarily a matter of choice dependent upon the requirements of a particular application. However, in most instances it is desirable to manufacture the portions of the arm subassembly 14 and the hand subassembly 16 from stainless steel in order to minimize potential particulate contamination.

In one preferred embodiment the hand motor 22 is a Number 23 frame stepper 1.8°, and the arm motor 28 is also a Number 23 frame stepper 1.8°. The hand shaft 26 has a diameter of 0.314 cm (0.125 in) while the arm shaft 34 has an outside diameter of 0.94 cm (0.375 in), an inside diameter of 0.33 cm (0.130 in) and a length of 7.5 cm (3.0 in). The elbow axis 20 is separated from the wrist axis 21 by a distance of 12.55 cm (5.0 in). The arm frame 54 has a maximum length of 15.37 cm (6.125 in), a height of 2.51 cm (1.0 in), an effective outside diameter at the elbow axis 20 end of 3.14 cm (1.250 in), and effective outside diameter at the wrist axis 21 end of 2.51 cm (1.0 in) and the cover 70 has a wall thickness of 0.5 cm (0.2 in). The support post screws 68 are equally spaced from the next and from the axes 20 and 21 by a distance of 2.51 cm (1.0 in).

The cam drivers 111 and 112 are preferably single piece manufacture and are securely bonded to the respective hand drive shaft 26 and wrist drive shaft 80. The central cylinder 114 has a diameter of 0.94 cm (0.375 in) while each of the eccentric cylinders has a diameter of 0.63 cm (0.250 in). The eccentricity distance L is 0.156 cm (0.062 in). The diameter of the driver apertures 126 and 128 is 0.94 cm (0.375 in), the diameter of the support post apertures 132 is 0.783 cm (0.312 in) and the total length of the linkage plates 124 is 12.6 cm (5.0 in).

The hand plate 94 of this embodiment has a total length of 7.5 cm (3.0 in) with a thickness in the palm portion 96 of 0.63 cm (.250 in), and a thickness in the pick or finger portion 98 of 0.469 cm (0.187 in). The distance from the wrist axis 21 to the beginning of the pick portion 98 is 5.02 cm (2.0 in) for an object 19 having a diameter of 15.1 cm (6.0 in), bearing in mind that the center of the object 19 should lie on the elbow axis 20 when the arm 14 and hand 16 are aligned in order to maintain maximum efficiency.

The total vertical height of the apparatus 10 is 20.1 cm (8.0 in) with the distance between the vacuum spindle cover 50 and base plate 56 being 1.57 cm (0.625 in) and the distance between the arm cover 70 and the hand plate 94 being 0.156 cm (0.062 in). These vertical dimensions may be altered as necessary for specific applications.

Special vacuum permeable and vacuum resistant bearings are utilized for the hand shaft bearings 67 and the wrist shaft bearings 90 existing within the interior volume 74 of the arm subassembly 14. These bearings are non-shielded, and nonlubricated lubricated. Normal shaft bearings of the shielded and lubricated type are utilized within the motive power subassembly 12.

The vacuum seals and gaskets utilized in the preferred embodiment 10 are preferably rubber O-rings, although spring backed teflon and/or ferrofluidic seals may also be used.

Many changes of materials and dimensions may be made without altering the invention. For example, different types of step motors may be substituted, other forms of vacuum seals may be utilized and plastic, rather than stainless steel parts may be incorporated to save weight.

Various other modifications and alterations of the assembly may be made without departing from the invention. Those skilled in the art will readily recognize additional alternate embodiments and uses. Accordingly, the above disclosure is not to be construed as limiting and the appended claims are to be interpreted as encompassing the entire spirit and scope of the invention.

INDUSTRIAL APPLICABILITY

The operation of the object transport apparatus 10 is entirely controllable by digital signals deliverable to the control circuitry 27 and the external pneumatic control elements 42. These signals will result in desired rotations of the hand drive motor 22 and the arm drive motor 28 necessary to position the object anywhere within the zone Z. The pneumatic controls 42 will be signal controlled to either secure or release the object 19 as desired.

An example of operation might be the pick-up of an object 19 from a pick-up point 146 (see FIG. 1) on the perimeter of zone Z and delivery to a diametrically opposed drop-off point 148. To accomplish this the motor 22 would be activated to align the longitudinal arm axis 106 along the radius including the pick-up point and the hand motor 28 would be activated to turn the hand subassembly 16 until it was also aligned with the same radius.

It should be noted that it is possible for the hand subassembly 16 to arrive at the pick-up 146 point by a variety of different routes. One of the major advantages of the present invention is that a point within the circular zone Z may be approached along almost any vector lying within the zone Z. For example, by fully aligning the hand 16 with the arm 14 prior to rotation of the arm 14 the pick-up point would be approached along the zonal perimeter. This same result would be accomplished by rotating the arm 14 into position first and then rotating the hand 16. However, by judicious simultaneous rotation of the arm 14 and the hand 16, at varying speeds if desired, the pick-up point may be approached along other vectors. For example, by starting from a point where the center of the object 19 (theoretical in this case) is positioned on the elbow axis 20 (the origin of zone Z) and the arm 14 is aligned such that arm axis 106 is perpendicular to the pick-up axis 150, an approach to the pick-up point directly along the pick-up axis 150 may be accomplished by causing the hand drive motor 22 to rotate at precisely double the speed of rotation of the arm drive motor 28. This sort of approach is industrially desirable, for example, when retrieving a silicon wafer from a cassette. Other selections of relative rotational velocities and timing of motor rotations may result in approaches along other desired vectors.

Once the hand 16 is in position the object is secured thereto along the gripping trough 104 by activating the pneumatic control 42 to supply a vacuum to the vacuum spindle 40 and thenceforth through the pneumatic aperture 38, the axial channel 36, the hand shaft channel 64, the interior volume 74, the lower pneumatic aperture 85, the hollow portion 84 of the wrist drive shaft 80, the upper pneumatic aperture 86, and the pneumatic bore 102 to the gripping trough 104.

Once the object 19 secured the motors 22 and 28 are again selectively activated to deliver the object 19 to the desired drop-off point 148 along the selected vector. The pneumatic control 42 then releases the vacuum and the object 19 is delivered to whatever receiving structure is located at drop-off point 148.

As shown by the above example, the object transport apparatus 10 has great flexibility in point access within the circular zone Z, directional approach to selected points and speed of approach. These aspects are extremely desirable in precision high technology applications such as semiconductor manufacture. Furthermore, by altering the dimensions of the components and/or substitution of different types of hand subassemblies 16 the apparatus 10 may be adapted to work with multitudinous different objects and environments. The solid construction even permits adaptation of the device to transport relatively massive objects. Computer control of the motors makes highly specialized and complex transport sequences a thing of relative ease and adaptability to existing object handling configurations an achievable option.

All of the above aspects and advantages make the invention an extremely desirable component in the semiconductor manufacturing industry and related fields. Accordingly, it is expected that the present invention will enjoy immediate, long-term and widespread industrial applicability and commercial utility.

I claim:

1. An object transport apparatus adapted to transport an object among points located in a planar zone, comprising:
    a motive power subassembly including a first positioning motor and a second positioning motor;
    an arm subassembly rotatable about an elbow axis by said second positioning motor; and
    a hand subassembly adapted to carry objects, attached to the arm subassembly at a wrist axis, displaced from said elbow axis, being rotatable about said wrist axis by said first positioning motor, with rotational force delivered by said first positioning motor being translated by an eccentric drive subassembly, said eccentric drive subassembly being situated within the arm subassembly intermediate said first rotational motor and the hand subassembly, and being adapted to deliver rotational motion of a hand drive shaft concentric with said elbow axis to a wrist drive shaft concentric with said wrist axis;
    wherein said eccentric drive subassembly includes:
        a first cam driver secured about said hand drive shaft, so as to rotate therewith, said first cam driver including an upper eccentric cylinder offset from said elbow axis and a lower eccentric cylinder offset from said elbow axis by the same magnitude but different direction from the offset of said upper eccentric cylinder;
        a second cam driver, congruent in construction to said first cam driver but secured about said wrist drive shaft;
        a first cam linkage including a circular first driver aperture and a circular second driver aperture, each said aperture having a diameter slightly larger than that of the respective eccentric cylinders such that said apertures slidably surround at least an annular portion of said respective upper eccentric cylinders of said first cam driver and said second cam driver, and a rigid linkage plate portion for delivering force from said first cam driver to said second cam driver; and
        a second cam linkage, congruent in construction to said first cam linkage but encompassing said respective lower eccentric cylinders of said first cam driver and said second cam driver.

2. The apparatus of claim 1 wherein said first and second cam linkages are attached such that the directional alignment of said upper and lower eccentric cylinders of said second cam driver are at all times identical with regard to their respective axes to those of the respective eccentric cylinders of said first cam driver.

3. The apparatus of claim 1 wherein the direction of offset of said lower eccentric cylinder is 90° rotationally disparate from that of said upper eccentric cylinder.

4. The apparatus of claim 1 and further including
    a central eccentric cylinder formed intermediate said upper eccentric cylinder and said lower eccentric cylinder on each of said first and said second cam drivers, said central eccentric cylinder being offset from said respective axis by the same magnitude as, but different direction of offset from, said upper and lower eccentric cylinders; and
    a third cam linkage, formed to resemble said first cam linkage but encompassing said respective central eccentric cylinders of said first cam driver and said second cam driver.

5. The apparatus of claim 4 wherein each of said upper, lower and central eccentric cylinders are rotationally offset from each other by 120°.

6. The apparatus of claim 1 wherein
    said first positioning motor delivers rotational motion to a hand drive shaft situated concentrically with said elbow axis, rotation of said hand drive shaft resulting in rotational motion of the hand subassembly but no external motion of the arm subassembly; and
    said second positioning motor delivers rotational motion to an arm drive shaft, coaxial with but independent from said hand drive shaft, rotation of said arm drive shaft resulting in rotational motion of the arm subsequently.

7. The apparatus of claim 6 wherein
    said second positioning motor is located coaxial with, but displaced from, said first positioning motor and includes a central aperture through which said hand shaft passes; and
    said arm drive shaft is coaxially exterior to said arm drive shaft.

8. The apparatus of claim 1 and further including
    pneumatic pressure generation and pneumatic pressure delivering means for generating and delivering positive and negative pneumatic pressure trough the arm subassembly to the hand subassembly; and
    pneumatic gripping means in the hand subassembly for pneumatically securing and releasing the objects, said pneumatic gripping means being controlled by said pneumatic pressure generation and delivery means.

9. The apparatus of claim 8 wherein
    said pneumatic pressure generation means includes a vacuum pump; and
    said pneumatic pressure delivery means includes a vacuum spindle surrounding a hollow arm drive shaft, an aperture in said hollow arm drive shaft within said spindle, a port between said arm drive shaft and a hollow interior volume of the arm subassembly, said hollow interior volume being otherwise pneumatically isolated, a hollow wrist drive shaft extending along said wrist axis into said interior volume and including a lower pneumatic aperture situated thereon within said interior volume and an upper pneumatic aperture situated thereon within the hand subassembly, and a pneumatic bore extending within the hand subassembly between said upper pneumatic aperture and said pneumatic gripping means.

10. The apparatus of claim 1 wherein the arm subassembly and the hand subassembly are environmentally isolated from the motive power subassembly.

11. The apparatus of claim 1 wherein said eccentric drive subassembly generates constant torque upon the hand subassembly regardless of the rotational position of said first positioning motor.

12. An object transport apparatus comprising:

a first positioning motor for rotationally turning a hand drive shaft to discrete rotational positions, said hand drive shaft being coaxial with a selected elbow axis;

a second positioning motor for rotationally positioning an arm subassembly to discrete rotational positions about said elbow axis, independent of the position of said hand drive shaft;

eccentric drive means, formed as a portion of said arm subassembly, for translating the rotational motion of said hand drive shaft to a wrist drive shaft coaxial with a selected wrist axis extending parallel to but remote from said elbow axis, the eccentric drive means including a first cam driver secured about said hand drive shaft so as to rotate therewith, said first cam driver including three axially spaced apart cam lobes, each of said cam lobes being eccentric to said hand drive shaft with the direction of eccentricity being offset form the direction of each other of said cam lobes by 120°, a second cam driver, being congruent to said first cam driver but secured about said wrist drive shaft, and a plurality of cam linkages, equal in number to said cam lobes, interconnecting respective cam lobes on said first cam driver and said second cam driver such that said wrist drive shaft rotates correspondingly with said hand drive shaft; and a hand subassembly secured to said wrist drive shaft so as to rotate therewith, the hand subassembly being adapted to support and carry an object.

* * * * *